United States Patent [19]

Shibata

[11] Patent Number: 5,757,911
[45] Date of Patent: May 26, 1998

[54] ENCRYPTION COMMUNICATION PROCESS AND TERMINAL FOR ENCRYPTION COMMUNICATION

[75] Inventor: Kohichi Shibata, Osaka, Japan

[73] Assignee: Mita Industrial Co., Ltd., Osaka, Japan

[21] Appl. No.: 399,638

[22] Filed: Mar. 7, 1995

[30] Foreign Application Priority Data

Mar. 10, 1994 [JP] Japan .................................. 6-039982
Mar. 10, 1994 [JP] Japan .................................. 6-039983

[51] Int. Cl.⁶ .................................. H04N 1/44; H04L 9/00
[52] U.S. Cl. .................................. 380/18; 380/21; 380/49
[58] Field of Search .................................. 380/18, 21, 49

[56] References Cited

U.S. PATENT DOCUMENTS

| | | | |
|---|---|---|---|
| 4,944,006 | 7/1990 | Citta | 380/20 |
| 5,159,630 | 10/1992 | Tseng | 380/18 |
| 5,261,003 | 11/1993 | Matsui | 380/50 |
| 5,420,922 | 5/1995 | Lunblad | 380/18 |

Primary Examiner—Thomas H. Tarcza
Assistant Examiner—Carmen D. White
Attorney, Agent, or Firm—Antonelli, Terry, Stout, & Kraus, LLP

[57] ABSTRACT

An encryption communication terminal includes an encryption key table 9a for registering secret encryption keys and an encryption box 9b for storing received encrypted data. When encrypted data is received, the decryption of the received encrypted data is tried by using a secret encryption key Ki registered in the encryption key table 9a. If the encrypted data can successfully be decrypted by using the registered secret encryption key Ki, the decrypted data is printed out. On the other hand, if the encrypted data cannot be decrypted, the received encrypted data is stored in the encryption box 9b, and then a reception report is output to notify that encrypted data is stored in the encryption box 9b. This reception report lets a recipient user know that encrypted data has been received but cannot be decrypted. The recipient user may ask the transmitter about the secret encryption key Ki to decrypt the received encrypted data.

9 Claims, 6 Drawing Sheets

F I G. 4
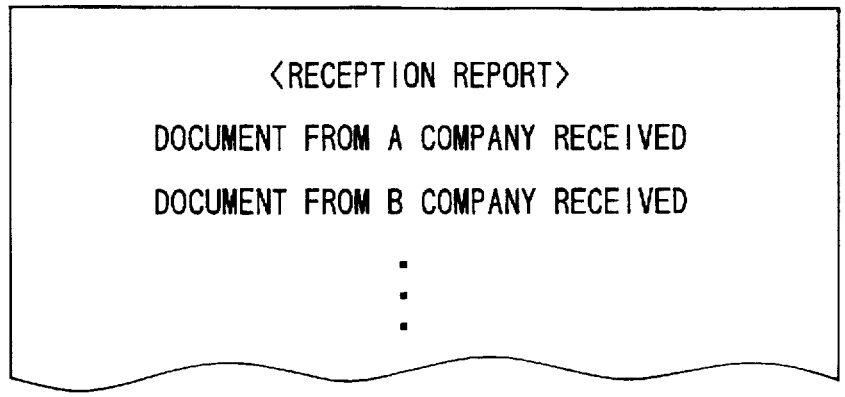

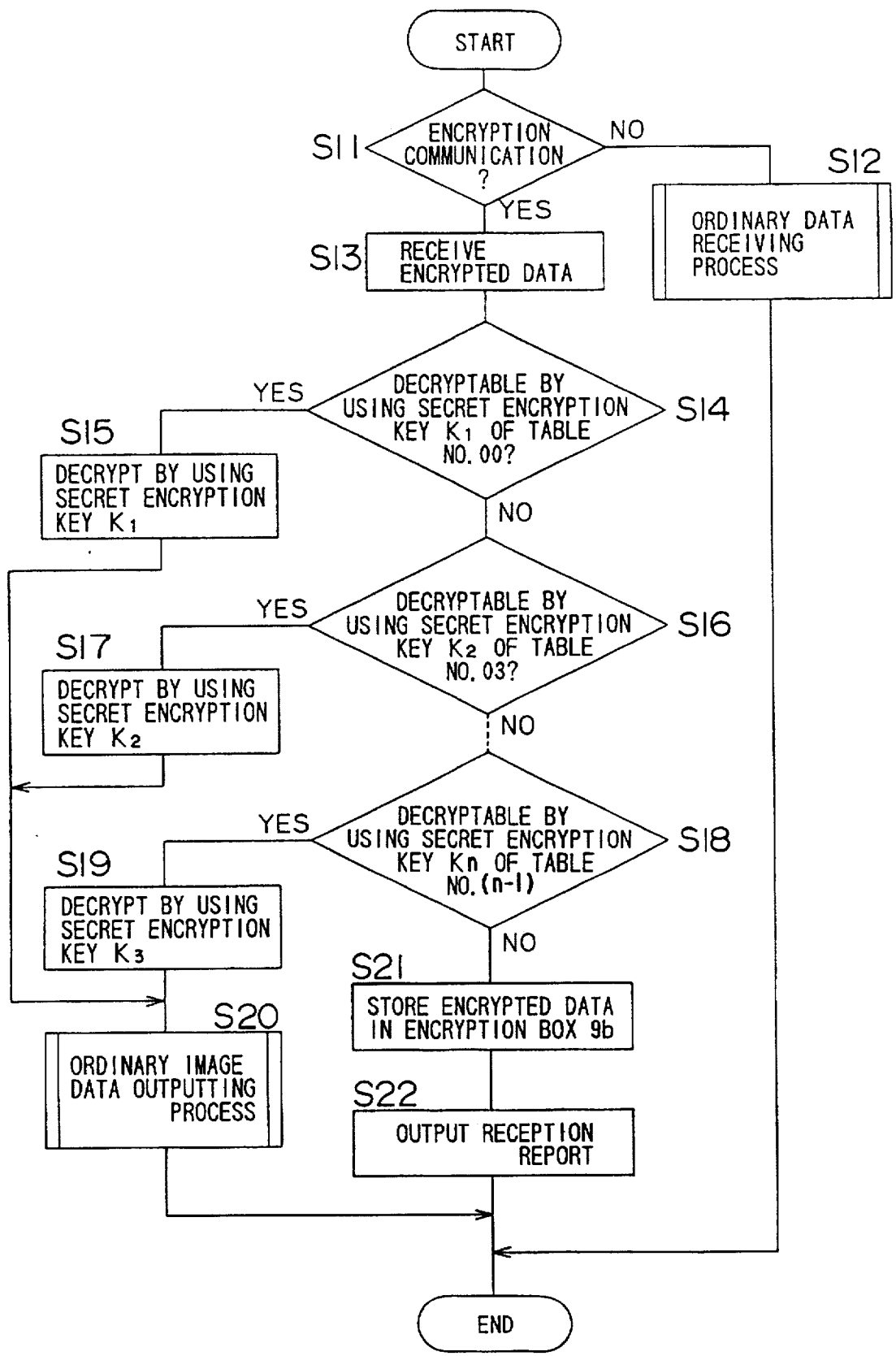

ENCRYPTION COMMUNICATION PROCESS AND TERMINAL FOR ENCRYPTION COMMUNICATION

BACKGROUND OF THE INVENTION

1. Field of the Invention

The present invention relates to terminals for encryption communications and, more particularly, to an improved data receiving process for encryption communications and improved management of secret encryption keys.

2. Description of the Related Art

In the field of data communications, communication data are conventionally processed through an encryption process for data security. In facsimile communications for transmitting and receiving original image data of a document original, for example, the original image data is processed through an encryption process for the security of the original image data being communicated.

One encryption process for processing original image data employs a so-called secret encryption key. More specifically, the original image data is transformed into completely different encrypted data through a predetermined logic operation by using a secret encryption key. In the decryption process, on the other hand, the original image data is reproduced from the encrypted data through a predetermined logic operation by using the same secret encryption key as used for the aforesaid encryption process.

This means that a common secret encryption key is required for the encryption and decryption processes. In a conventional encryption communication method, the transmitter and receiver of the encryption communication preliminarily decide the secret encryption key, and register the selected secret encryption key in nonvolatile memories respectively provided in the transmitter terminal and receiver terminal.

However, if the secret encryption key cannot preliminarily be decided, for example when the transmitter wants to transmit data during the absence of the receiver, the transmitter cannot carry out encryption communication. Further, in a case in which either the transmitter or the receiver registers an incorrect secret encryption key, even if the secret encryption key to be used for the encryption communication is preliminarily decided, the encryption communication cannot be carried out. Therefore, the user interface is very poor.

Further, for encryption communications among a plurality of facsimile machines, it is necessary to preliminarily decide and register a secret encryption key for each of the facsimile machines. In such case, transmitted encrypted data is processed through the decryption process by using a secret encryption key stored in a receiver facsimile machine in correspondence to the facsimile number of a transmitter facsimile machine. To identify the transmitter facsimile machine, a CIG (calling subscriber identification) signal including the facsimile number of the transmitter facsimile machine is transmitted prior to the transmission of the encrypted data.

However, the secret encryption keys should be registered in strict correspondence with the plural facsimile numbers of transmitter facsimile machines. That is, the secret encryption keys for the respective transmitters should be correctly registered and managed. Accordingly, the registration and management of the secret encryption keys are very complicated.

SUMMARY OF THE INVENTION

In view of the foregoing, it is an object of the present invention to provide an encryption communication terminal which is capable of carrying out encryption communications without any preliminary agreement about a secret encryption key between communicators.

It is another object of the present invention to provide an encryption communication terminal which is capable of carrying out encryption communications even if an incorrect secret encryption key is registered.

It is still another object of the present invention to provide an encryption communication terminal which can easily manage secret encryption keys.

In accordance with the present invention, there is provided an encryption communication terminal comprising an encryption key table for registering secret encryption keys and an encryption box for storing received encrypted data. When the encrypted data is received, the decryption of the received encrypted data is tried by using a secret encryption key Ki registered in the encryption key table. If the encrypted data can successfully be decrypted by using the registered secret encryption key Ki, the decrypted data is printed out.

On the other hand, if the encrypted data cannot be decrypted by using the secret encryption key Ki registered in the encryption key table, the received encrypted data is stored in the encryption box, and then a reception report is output to notify that the encrypted data is stored in the encryption box.

This reception report lets a recipient user know that the encrypted data has been received but cannot be decrypted by using the registered secret encryption key Ki. The recipient user may ask the transmitter for the secret encryption key to decrypt the received encrypted data.

With such construction of the encryption communication terminal, the encrypted data can be received and thereafter decrypted even if the secret encryption key is not preliminarily decided or the registered encryption key is incorrect. Thus, encryption communications can be achieved.

In accordance with another mode of the present invention, a plurality of secret encryption keys Ki are registered in the encryption key table, and the decryption of received encrypted data is tried by using the registered secret encryption keys Ki successively read out of the encryption key table. Accordingly, the secret encryption keys Ki registered in the encryption key table are not necessarily required to correspond to transmitters. Therefore, the registration and management of the secret encryption keys can be conveniently carried out.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram showing an exemplary reception report output when encrypted data received by the facsimile machine cannot be decrypted.

FIG. 6 is a flow chart of another data receiving process in the facsimile machine.

DETAILED DESCRIPTION OF THE PREFERRED EMBODIMENTS

Figure 1:
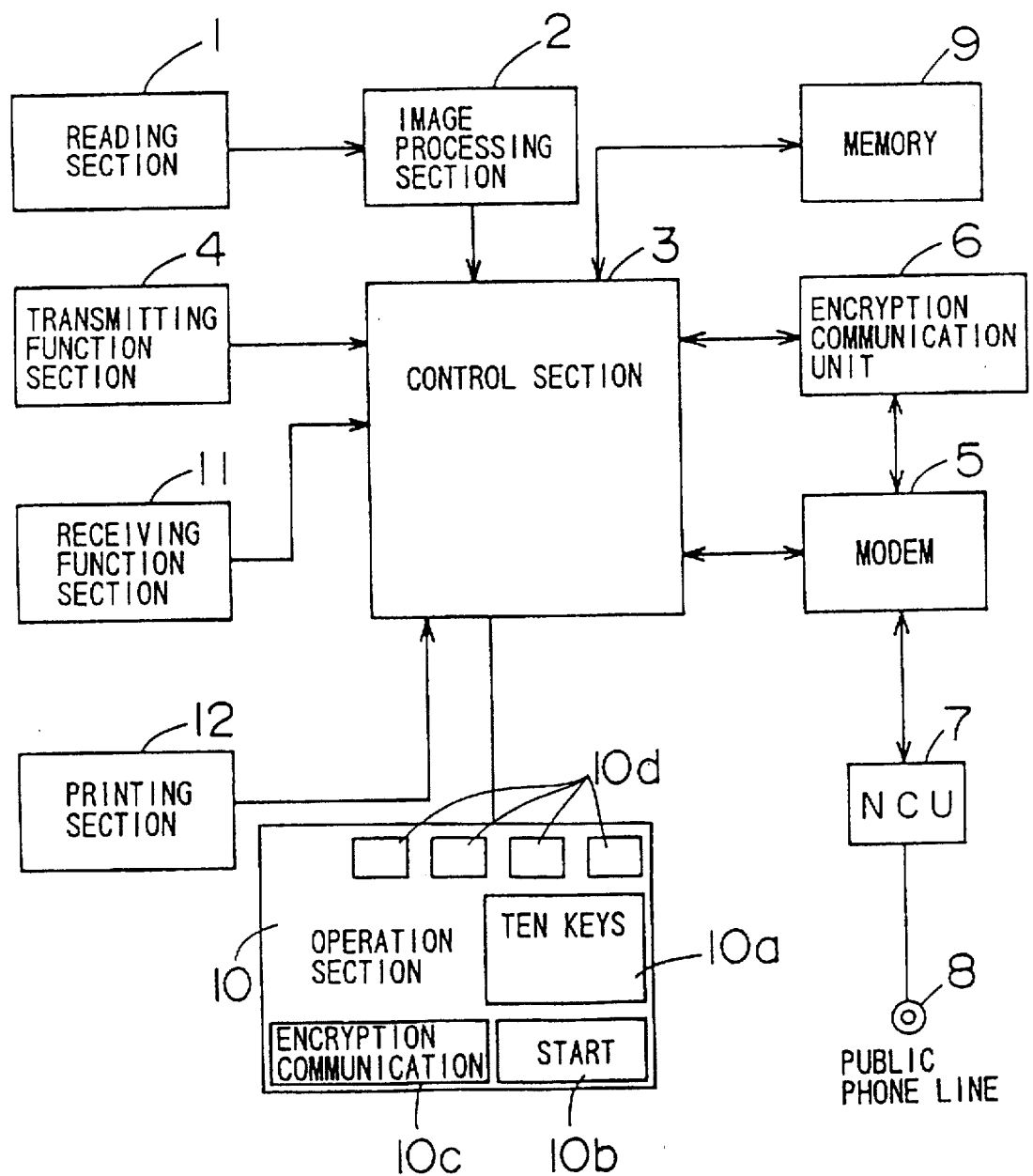
FIG. 1 is a block diagram illustrating the electrical construction of a facsimile machine in accordance with one embodiment of the present invention.

FIG. 1 is a block diagram illustrating the electrical construction of a facsimile machine in accordance with one embodiment of the present invention. The facsimile machine has a reading section 1 for reading (e.g., optically) a document original and outputting original image data for transmission. The original image data output from the reading section 1 is sent to an image processing section 2 to be subjected to a predetermined image processing. The image data subjected to the image processing is sent to a transmitting function section 4 via a control section 3 to be subjected to compression-encoding processes such as a MH (modified Huffman) process, MR (modified relative element address designate) process, and the like which are necessary for facsimile communications. The original image data subjected to these compression-encoding processes is sent to a modem 5 via the control section 3. When an encryption communication is to be carried out, the compression-encoded original image data is subjected to an encryption processing in an encryption communication unit 6 to be transformed into encrypted data by using a predetermined secret encryption key, and then the encrypted data is sent to the modem 5. The compression-encoded original image data or the encrypted data is sent out to a public phone line 8 via a network control unit (NCU) 7.

Figure 2:
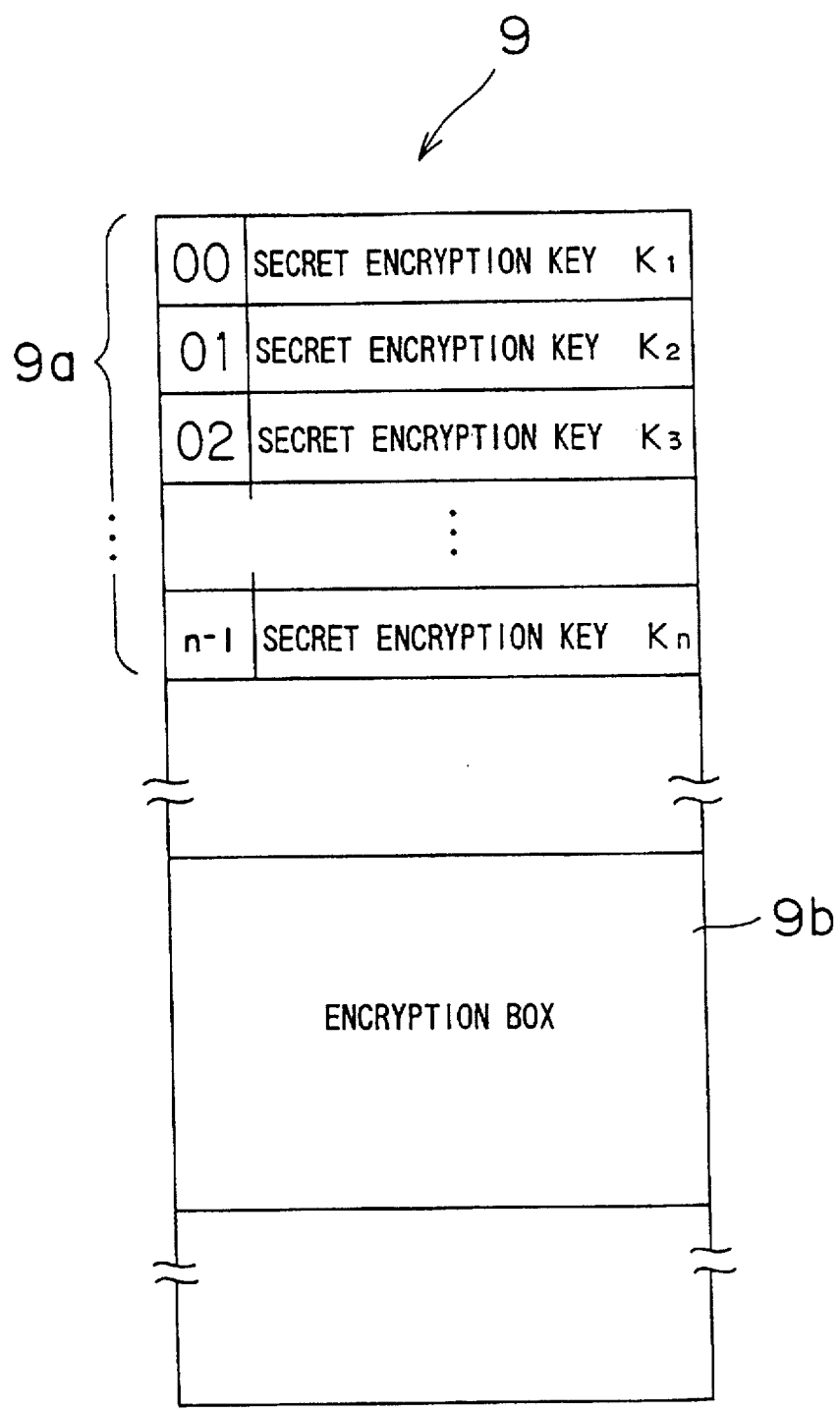
FIG. 2 is a conceptual diagram illustrating the construction of a memory incorporated in the facsimile machine.

Further, the facsimile machine has a memory 9 which serves as a data storage means and encryption key storage means. The memory 9 includes an encryption key table 9a as shown in FIG. 2. The encryption key table 9a preferably comprises a nonvolatile memory such as an EEPROM. A plurality of secret encryption keys $K_1$, $K_2$, $K_3$, ... and $K_n$ (hereinafter generally referred to as "secret encryption keys Ki"), necessary for encryption and decryption (which will be described later), are stored in the encryption table 9a in one-to-one correspondence to table numbers "00", "01", "02", ... and "n−1" respectively assigned to the facsimile numbers of plural transmitter facsimile machines. These secret encryption keys Ki are preliminarily decided and agreed upon between the receiver and the respective transmitters. An exemplary encryption key table 9a is shown in the following Table 1.

TABLE 1

| Table numbers | Secret encryption keys |
|---|---|
| 00 | 0123456789 |
| 01 | 1232233234 |
| 02 | 1313131313 |
| 03 | 9876543210 |
| 04 | |
| 05 | |
| 06 | |
| . | |
| . | |
| n | 1212121212 |

In Table 1, table numbers having blanks in the column of the secret encryption keys mean that secret encryption keys of some table numbers for those table numbers have not been registered yet.

The memory 9 also has an encryption box 9b as shown in FIG. 2. The encryption box 9b comprises a DRAM, SRAM or the like. As will be described later, the encryption box 9b serves to temporarily store for received encrypted data that cannot be decrypted.

Further, the facsimile machine of FIG. 1 has an operation section 10. Arranged on the operation section 10 are such keys as ten keys 10a operated by a user for inputting a facsimile number or a like, a start key 10b for inputting a start signal for actuating the facsimile machine, an encryption communication key 10c for designating an encryption communication and function keys 10d for setting the operation mode of the facsimile machine such as an output mode or a secret encryption key setting mode. The types of keys are not limited to the aforesaid ones. Other keys may, as required, be added thereto or substituted therefore.

When the facsimile machine shown in FIG. 1 receives data, the data is sent to the modem 5 via the NCU 7. If the received data is simply compression-encoded image data, that is, the data is sent through an ordinary facsimile communication, the received image data is demodulated in the modem 5, and then decoded (or decompressed) into original image data in the receiving function section 11. Thereafter, the original image data is sent to a printing section 12 and then printed out on a paper sheet in the printing section 12 for the reproduction of the transmitted image data of a document original.

On the other hand, if the received data is encrypted data, that is, the data is sent through an encryption communication, the received encrypted data is demodulated in the modem 5, and then subjected to a decryption process in the encryption communication unit 6. Thereafter, the decrypted data is decoded into original image data in the same manner as the foregoing and then printed out on a paper sheet in the printing section 12 for the reproduction of the transmitted image data of a document original.

Figure 3:
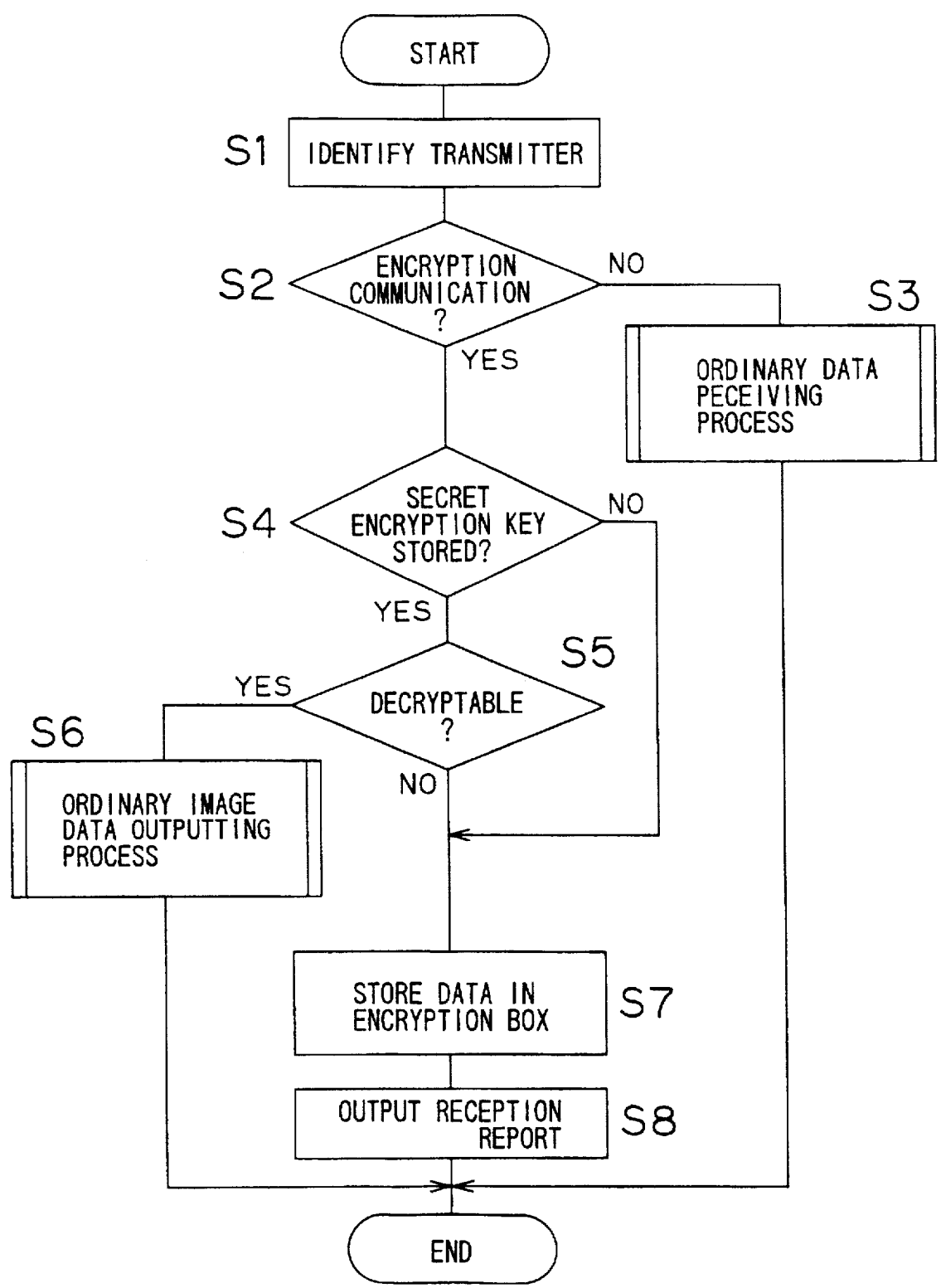
FIG. 3 is a flow chart of a data receiving process in the facsimile machine.

FIG. 3 is a flow chart of a data receiving process in the facsimile machine. When the connection between the transmitter facsimile machine and receiver facsimile machine is established, it is first identified to which transmitter facsimile machine the receiver facsimile machine is connected (step S1). The transmitter facsimile machine is identified by a table number assigned to the facsimile number of the transmitter facsimile machine and included in a CIG (calling subscriber identification) signal which is transmitted prior to the transmission of the image data or encrypted data.

Then, it is judged in the receiving facsimile machine whether or not the current communication is an encryption communication (step S2). This judgement is based on whether or not a flag indicative of encryption communication is set, which flag is contained in an NSS (non-standard facilities set-up) signal transmitted prior to the transmission of the image data or encrypted data. As the result of the judgement, if the flag is not set, it is judged that the current communication is an ordinary facsimile communication, and the aforesaid ordinary facsimile receiving process is carried out (step S3). If the flag is set, on the other hand, it is judged that the current communication is an encryption communication.

If it is judged that the current communication is an encryption communication, it is judged, in response thereto, whether or not a secret encryption key Ki is stored in correspondence to the table number included in the aforesaid CIG signal (step S4). As a result, if a secret encryption key Ki is stored, the stored secret encryption key Ki is read out, and it is judged whether or not the received encrypted data can be decrypted by using the secret encryption key Ki thus read out (step S5). On the other hand, if the secret encryption key Ki is not stored, it is considered that the secret encryption key was not preliminarily decided by the transmitter and receiver, and the process directly enters a step S7 which will be described later.

Next, the judgement process performed in the aforesaid step S5 will more specifically be described.

The first n (e.g., n=1 to 5) lines of the received encrypted data are subjected to a decryption process by using the read-out secret encryption key Ki.

If the read-out secret encryption key Ki agrees with a secret encryption key which was used to generate the encrypted data in the transmitter facsimile machine, the image data to be output after the decryption process has a bit number per line determined by the size of the transmitted original document. More specifically, if the transmitted original document is of A4 size, the bit number per line is 1728 bits.

On the other hand, if the read-out secret encryption key Ki does not agree with the secret encryption key which was used to generate the encrypted data in the transmitter facsimile machine, the image data to be output does not have 1728 dots per line, even when that the transmitted original document is of A4 size. That is, whether or not the encrypted data is decryptable can be judged based on the bit number per line of the image data to be output.

As the result of the judgement in the step S5, if it is judged that the encrypted data is decryptable, then the encrypted data is decrypted, and the ordinary image data outputting process, including decoding and printing, is performed (step S6). On the other hand, if it is judge that the encrypted data is not decryptable, it is considered that either the transmitter or the receiver used an incorrect secret encryption key, and the received encrypted data is stored in the encryption box 9b of the memory 9 (step S7). In response thereto, a reception report indicating that encrypted data is stored in the encryption box 9b is output from the printing section 12 (step S8). An exemplary reception report is shown in FIG. 4.

Thus, if the secret encryption key is not preliminarily decided or if an incorrect secret encryption key is used, the received encrypted data is stored in the encryption box 9b and, therefore, the encryption communication can be carried out.

Further, since the reception report is output in response to the encrypted data being stored in the encryption box 9b, the recipient user can easily and promptly detect the reception of the encrypted data.

After confirming the reception of the encrypted data by the reception report, the recipient user can reproduce the transmitted original image from the received encrypted data. The original image data outputting process will next be described.

Figure 5:
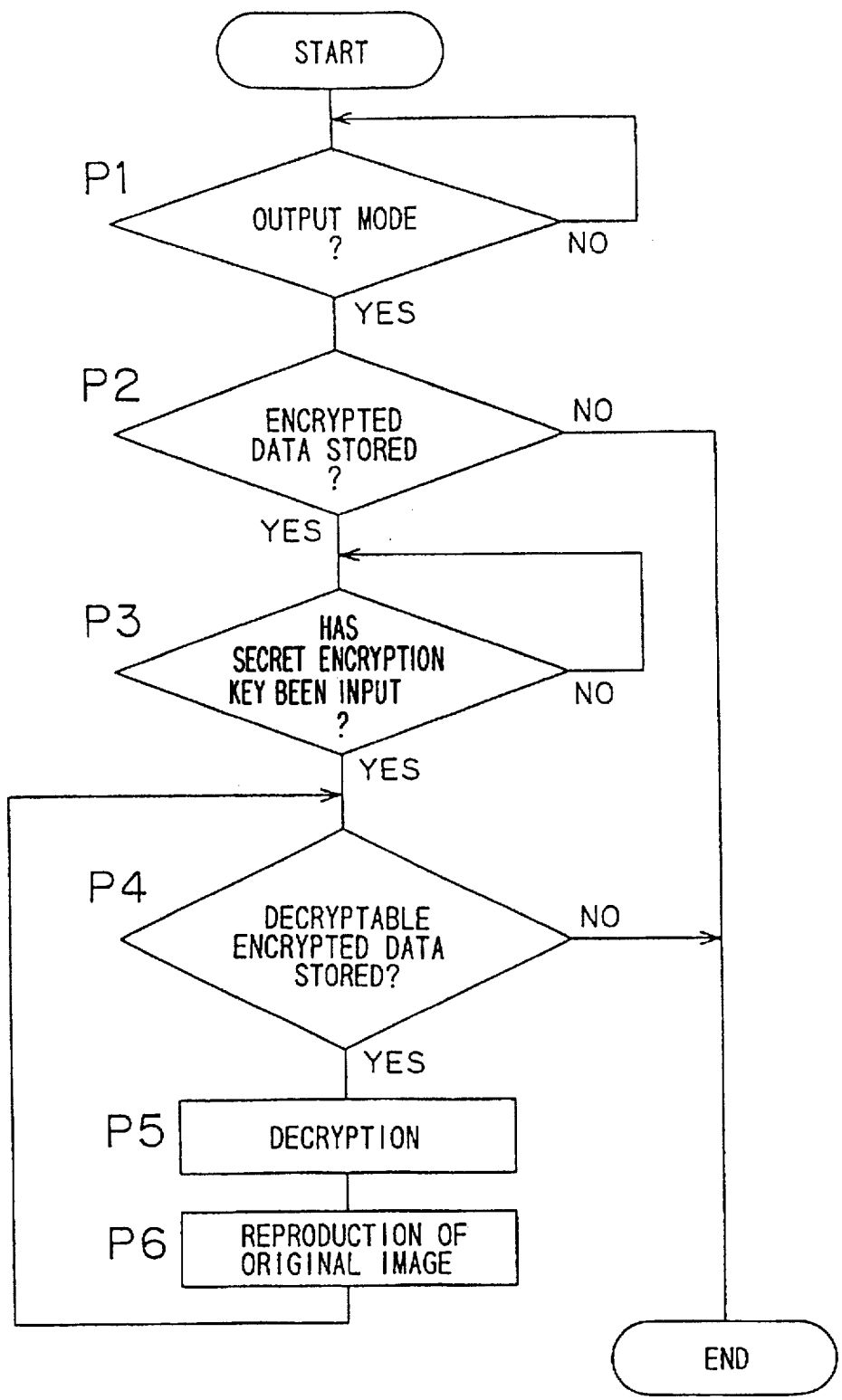
FIG. 5 is a flow chart of an image outputting process in the facsimile machine.

FIG. 5 is a flow chart of an image outputting process in the facsimile machine. In order to reproduce the transmitted original image from the encrypted data stored in the encryption box 9b, it is necessary to switch the operation mode of the facsimile machine to an output mode. When the recipient user operates the function key 10d to switch the operation mode to the output mode (step P1), the control section 3 checks whether or not encrypted data is stored in the encryption box 9b (step P2). As a result, if encrypted data is not stored, the process exits from the output mode. On the other hand, if encrypted data is stored, it is judged whether or not a secret encryption key has been input (step P3).

The fact that the encrypted data is stored in the encryption box 9b means that there was not stored a secret encryption key Ki necessary to decrypt the encrypted data in the encryption key table 9a or that the secret encryption key Ki stored in the encryption key table 9a is incorrect. Therefore, the secret encryption key used for the encryption of the original image data for transmission is necessary for reproducing the original image from the encrypted data stored in the encryption box 9b. The recipient user can determine the secret encryption key, for example, by asking the transmitter about it.

When the recipient user switches the operation mode of the facsimile machine to a secret encryption key setting mode for inputting a secret encryption key, and then inputs the secret encryption key, it is judged whether or not there is stored any encrypted data that can be decrypted by using the input secret encryption key (step P4). The judging process is the same as that described with reference to FIG. 3 and, therefore, no explanation will be given of it. As the result of the judgement, if there is stored no decryptable encrypted data, the outputting process ends. On the other hand, if decryptable encrypted data is stored, the encrypted data is decrypted by using the input secret encryption key (step P5). Thereafter, the data is subjected to the decoding process, and then the transmitted original image is printed out on a paper sheet by the printing section 12 for reproduction (step P6). Then, the process returns to the step P4, and the aforesaid process sequence is repeated until all the stored encrypted data decryptable by using the inputted secret encryption key are decrypted.

In the aforesaid embodiment, it is identified to which transmitter facsimile machine the receiver facsimile machine is connected (i.e., the transmitter is identified) in the step S1 shown in FIG. 3, then the secret encryption key Ki stored in correspondence to the table number of the transmitter facsimile machine thus identified is read out in the step S4, and it is judged in the step S5 whether or not the transmitted encrypted data can be decrypted by using the secret encryption key Ki thus read out.

Instead of the aforesaid process, as shown in a flow chart in FIG. 6, it may be judged whether or not the encrypted data can be decrypted by using the plural secret encryption keys Ki successively read out of the encryption key table 9a, without identifying the transmitter facsimile machine. By employing such a process, the secret encryption keys Ki can be easily managed, because the secret encryption keys are not necessarily registered and managed in strict correspondence to the transmitter facsimile machines.

More specific explanation will be given of this process with reference to FIG. 6.

When the connection between the transmitter facsimile machine and the receiver facsimile machine is established, the receiver facsimile machine first judges whether or not the current communication is an encryption communication (step S11). This judgement is based on whether or not a flag indicative of the encryption communication is set, which flag is contained in an NSS (non-standard facilities set-up) signal transmitted prior to the transmission of the image data or encrypted data. As the result of this judgement, if the flag is not set, it is judged that the current communication is an ordinary facsimile communication, and the aforesaid ordinary facsimile receiving process is carried out (step S12). If the flag is set, on the other hand, it is judged that the current communication is an encryption communication.

In the case of an encryption communication, when encrypted data transmitted from the transmitter facsimile machine is received (step S13), any one of the secret encryption keys is read out of the encryption key table 9a, and then it is judged whether the received encrypted data can be decrypted by using the secret encryption key thus read out (step S14). In this embodiment, it is first judged whether or not the encrypted data can be decrypted by using a secret encryption key $K_1$.

The judgement process performed in the step S14 will more specifically be described. The first n (e.g., n=1 to 5) lines of the received encrypted data are subjected to the decryption process by using the read-out secret encryption key $K_1$.

If the read-out secret encryption key $K_1$ agrees with a secret encryption key which was used to generate the encrypted data in the transmitter facsimile machine, the image data to be output after the decryption process has a bit number per line determined by the size of the transmitted original document. More specifically, if the transmitted original document is of A4 size, the bit number per line is 1728 bits.

On the other hand, if the read-out secret encryption key $K_1$ does not agree with the secret encryption key which was used to generate the encrypted data in the transmitter facsimile machine, the image data to be output does not have 1728 dots per line even in case that the transmitted original document is of A4 size. That is, whether or not the encrypted data is decryptable can be judged, based on the bit number per line of the image data to be output.

As the result of the judgement in the step S14, if it is judged that the encrypted data is decryptable by using the secret encryption key $K_1$, the encrypted data subsequently received is processed through the decryption process by using the secret encryption key $K_1$ (step S15), and then the ordinary image data outputting process including decoding and printing is performed (step S20).

On the other hand, if it is judged that the encrypted data cannot be decrypted by using the secret encryption key $K_1$, it is next judged in the aforesaid manner whether or not the encrypted data can be decrypted by using a secret encryption key $K_2$ (step S16). As a result, if it is judged that the encrypted data can be decrypted by using the secret encryption key $K_2$, the encrypted data subsequently received is processed through the decryption process by using the secret encryption key $K_2$ in the same manner as described above (step S17). On the other hand, if it is judged that the encrypted data cannot be decrypted by using the secret encryption key $K_2$, it is next judged whether or not the encrypted data can be decrypted by using a secret encryption key $K_3$ (step S18). As a result, if it is judged that the encrypted data can be decrypted by using the secret encryption key $K_3$, the decryption process is carried out by using the secret encryption key $K_3$ (step S19). If it is judged that the encrypted data cannot be decrypted using the secret encryption key $K_3$, this process is repeated through all of the encryption keys Ki stored in table 9a until a secret encryption key is found with which the encrypted data can be decrypted.

If the encrypted data cannot be decrypted by using any of the secret encryption keys Ki registered in the encryption key table 9a, the received encrypted data is stored in the encryption box 9b in the same manner as in the steps S7 and S8 described with reference to FIG. 3 (step S21). Then, a reception report indicating that the encrypted data is stored in the encryption box 9b is output from the printing section 12 (step S22).

As can be understood from the foregoing, a plurality of secret encryption keys Ki stored in the encryption key table 9a are successively employed for the decryption process in accordance with this embodiment. Accordingly, the secret encryption keys are not necessarily required to be stored in strict correspondence to the transmitter facsimile machines, and hence decryption can be achieved simply by storing the secret encryption keys in the encryption key table 9a. Thus, the management of the secret encryption keys can be facilitated, thereby improving the user interface.

While the present invention has been described by way of the above embodiments, it should be understood that the present invention is not limited to the specifics described in the embodiments. For instance, though the foregoing embodiments have taken an example of a facsimile machine as a terminal, the present invention can be widely applied to terminals of various kinds including personal computers, word processors and other terminals capable of encryption communications.

Further, though the foregoing embodiments have taken an example of encryption communications for the transmission of image data, the present invention can be applied to encryption communications for the transmission of other data.

Although the present invention has been described and illustrated in detail, it is clearly understood that the same is by way of illustration and example only and is not to be taken by way of limitation, the spirit and scope of the present invention being limited only by the terms of the appended claims.

I claim:

1. An encryption communication terminal, comprising:
   receiving means for receiving data from a predetermined communication line;
   judging means for judging whether or not the data received by the receiving means is encrypted data generated from original image data through an encryption process by using a predetermined secret encryption key;
   encryption key registry means for registering a plurality of secret encryption keys; and
   decryption means responsive to the data received by the receiving means being judged to be encrypted data, for successively using the plurality of secret encryption keys registered in the encryption key registry means to decrypt the encrypted data received by the receiving means, said decryption means including means for processing the first n lines of the received encrypted data through the decryption process by using one of the secret encryption keys and means responsive to the resulting output decrypted data having a predetermined bit number per line for judging whether the received data is successfully decrypted.

2. An encryption communication terminal as set forth in claim 1, wherein said decryption means further includes means for reading out any one of the plural secret encryption keys registered in the encryption key registry means and judging whether or not the received encrypted data can be decrypted by using the read-out secret encryption key, and if the encrypted data is judged to be undecryptable with the read-out secret encryption key, reading another secret encryption key out of the encryption key registry means and judging whether or not the received encrypted data can be decrypted by using said another read-out secret encryption key, so as to try the decryption of the received encrypted data by successively using the plurality of secret encryption keys registered in the encryption key registry means.

3. An encryption communication terminal as set forth in claim 1, further comprising:
   output means for reproducing non-encrypted data received by the receiving means and data decrypted by the decryption means.

4. An encryption communication process for decrypting received encrypted data, said process comprising the steps of:

selecting one of plural secret encryption keys registered in an encryption key registry means and trying decryption of received encrypted data by using the selected one of the secret encryption keys;

if the received encrypted data cannot be decrypted by using the selected one of the secret encryption keys, then selecting another one of the plural secret encryption keys and trying decryption of the received encrypted data by using the selected another one of the registered secret encryption keys;

if the received encrypted data cannot be decrypted by using the selected another one of the secret encryption keys, then successively selecting each of the remaining ones of the secret encryption keys and trying decryption of the received encrypted data by successively using said remaining ones of the registered secret encryption keys until the encrypted data can be decrypted; and if the received encrypted data cannot be decrypted by using any of the plural secret encryption keys registered in the encryption key registry means, storing the received encrypted data in a data storage means and issuing a reception report indicating that the received encrypted data is stored.

5. An encryption communication process as set forth in claim 4, further comprising:

reproducing decrypted data.

6. An encryption communication terminal, comprising:

receiving means for receiving data from a predetermined communication line;

data judging means for judging whether or not the data received by the receiving means is encrypted data generated from original image data through an encryption process by using a predetermined secret encryption key;

decryption possibility judging means for judging, when the data judging means judges that the data received by the receiving means is encrypted data, whether or not the encrypted data is decryptable;

data storage means for storing the received encrypted data when the decryption possibility judging means judges that the received encrypted data is not decryptable; and reception report outputting means responsive to the storing of encrypted data in the data storage means, for outputting a reception report indicating that the encrypted data is stored in the data storage means.

7. An encryption communication terminal as claimed in claim 6, further comprising encryption key registry means for registering a plurality of secret encryption keys, wherein said decryption possibility judging means includes means for trying the decryption of the received encrypted data by using any of the secret encryption keys registered in the encryption key registry means.

8. An encryption communication terminal as set forth in claim 6, further comprising:

decryption means for decrypting the received encrypted data when the decryption possibility judging means judges that the received encrypted data is decryptable.

9. An encryption communication terminal as set forth in claim 8, further comprising:

output means for reproducing non-encrypted data received by the receiving means and data decrypted by the decryption means.

* * * * *